US012326042B1

(12) United States Patent
Lockhart

(10) Patent No.: US 12,326,042 B1
(45) Date of Patent: Jun. 10, 2025

(54) DEPLOYABLE SAFETY LADDER

(71) Applicant: Kirklynn S. Lockhart, Saint John (CA)

(72) Inventor: Kirklynn S. Lockhart, Saint John (CA)

( * ) Notice: Subject to any disclaimer, the term of this patent is extended or adjusted under 35 U.S.C. 154(b) by 982 days.

(21) Appl. No.: 17/392,576

(22) Filed: Aug. 3, 2021

(51) Int. Cl.
*E06C 9/14* (2006.01)
*E05B 65/10* (2006.01)
*E06C 7/00* (2006.01)

(52) U.S. Cl.
CPC ............ *E06C 9/14* (2013.01); *E05B 65/1033* (2013.01); *E06C 7/003* (2013.01)

(58) Field of Classification Search
CPC ......... E06C 9/14; E06C 7/003; E05B 65/1033
See application file for complete search history.

(56) References Cited

U.S. PATENT DOCUMENTS 1,753,798 A * 4/1930 Martin ...................... E06C 9/14 182/78
4,919,235 A * 4/1990 DelSavio .................. E06C 9/14 49/31
5,605,203 A 2/1997 Chang et al.
6,129,178 A * 10/2000 Shupp, Jr. ................ A62B 5/00 182/76
6,244,380 B1 6/2001 Naccarato
6,279,681 B1 8/2001 Dibelardino et al.
6,334,510 B2 1/2002 Dibelardino
6,460,654 B2 10/2002 Dibelardino et al.
7,337,878 B1 * 3/2008 Lockhart .................. A62B 1/00 182/86
7,482,919 B1 * 1/2009 Franklin ................... E06C 9/14 340/506
8,522,487 B2 * 9/2013 Whiting .................... E05C 1/14 52/72
9,080,383 B2 * 7/2015 Meillet ................. F16D 63/006
D739,958 S 9/2015 Bangura
2004/0108163 A1 * 6/2004 Johnson .................... E06C 9/14 182/70

FOREIGN PATENT DOCUMENTS

GB 2222848 B * 6/1992 ............. E06C 7/003

* cited by examiner

*Primary Examiner* — Kyle R Grabowski
(74) *Attorney, Agent, or Firm* — Cramer Patent & Design, PLLC.; Aaron R. Cramer

(57) ABSTRACT

A deployable safety ladder is retained within a housing having a removable safety pin which when removed causes the deployable ladder and safety pin to separate via a pair of springs. The device further comprises a pivotable grab bar. Use of the grab bar activates a strobe light and audible alarm. The strobe light and audible alarm are each powered by a rechargeable solar powered battery. A fireproof blanket is removably secured within the housing.

20 Claims, 8 Drawing Sheets

DEPLOYABLE SAFETY LADDER

RELATED APPLICATIONS

None.

FIELD OF THE INVENTION

The present invention relates generally to a ladder and more specifically to a deployable safety ladder.

BACKGROUND OF THE INVENTION

As any home owner will attest, security is an area of primary concern. Due to the fact that people tend to place a high value on their property and personal safety, the marketplace has responded with a variety of products that are intended to protect one's life and property. One product that has seen wide use is the emergency escape ladder used on two- or three-story homes and buildings. This chain ladder is unrolled from the window and the person climbs down to safety. While this process sounds easy, there are several steps involved with this process. First, the ladder must be retrieved from its storage location. Second, it must be hooked to the window sill, hopefully in a secure fashion. Finally, the ladder must be unrolled, hopefully in an untangled manner. Additionally, it must be remembered that all of these steps are occurring under an emergency situation, where smoke, darkness, fear, unfamiliar surroundings and the like may be present. Accordingly, there exists a need for a means by which people can quickly and safely exit a multilevel home or building under an emergency situation without the difficulties associated with current methods. The development of the Deployable Safety Ladder fulfills this need.

SUMMARY OF THE INVENTION

The principles of the present invention provides for a deployable safety escape ladder, having an outer enclosure which is adapted to be installed below an upper floor window, a photovoltaic cell which is disposed on a face of the outer enclosure, a release latch disposed on a top of the outer enclosure for activation, a pair of conduits exiting a side of the outer enclosure which house a mechanical cable, a mechanical disconnecting means which is inserted within in the mechanical cable, a backing plate which is disposed in a wall cavity below the upper floor window to provide structural rigidity to the outer enclosure, an audio/video playback device which is disposed alongside the upper floor window, a pair of screen cutting edges cutting through one or more screens in the upper floor window, a shaft connecting a pair of glass breaking heads and the pair of screen cutting edges to the ergonomic handle grip, a safety grab bar pivoted into an upward vertical position along a grab bar travel path to serve as a holding aid for climbing through the upper floor window, a spring locking pin disposed within the mounting bracket locks the safety grab bar in an upright position during usage, a deployment cable attached to the safety grab bar and is routed through an eye-ring where it terminates at an attachment point on the interior of the front surface The photovoltaic cell supplies electrical power to the deployable safety escape ladder. The audio/video playback device provides a plurality of instructions, a plurality of demonstrations, and a plurality of usage information for the escape ladder. The safety grab bar is secured via a mounting bracket which allows for a 90° swing path of the grab bar travel path, a plurality of rungs each having a hollow tubular member, a threaded rod passing through each of the rungs, a plurality of opposing aligned links of a plurality of chain rails secured with a pair of fasteners fastening teach of the rungs to the chain rail, and a bottom surface having a non-slip coating serving as a first step. The spring locking pin is pressed to allow the safety grab bar to be lowered to its stowed position after usage. The deployment cable provides for the automatic upright positioning of the safety grab bar.

The outer enclosure may be made of weatherproof material. The release latch may activate a closure clasp connected to the mechanical cable and may allow the top surface and the front surface to swing outward along a stainless-steel hinge following a travel path. The release latch may activate a ladder tray holding a ladder having a plurality of solid rungs and a plurality of chain rails that travel outward along a ladder travel path propelled by a pair of springs. The chain rails may be each tethered to the rear surface by a plurality of connecting links. The release latch may be centrally located on the sloped upper surface and is provided with a breakable glass shield. The breakable glass shield may be intended to prevent tampering with the as well as to prevent inadvertent activation. The breakable glass shield may include weather protection for the release latch. The release latch may be replaceable via an entry slot and a security tab. The mechanical cable may connect the deployable safety escape ladder located on one or more upper floors as well as one or more lower floors of the building.

The mechanical cable may serve to activate the deployable safety escape ladder located on one or more lower floors of the building when the deployable safety escape ladder is activated. The mechanical disconnecting means may be utilized to repair, to maintain, or to replace of an escape ladder is required without the desire to activated lower units. The mechanical disconnecting means may be a slip pin fitting. The mechanical disconnecting means may be a screw fitting. The audio/video playback device may operate on a continuously looping manner which will indoctrinate one or more occupants of the building in which the escape ladder is installed. The audio/video playback device may be a safety hammer enclosure containing a safety hammer. The safety hammer enclosure may be opened via a recessed hand grip which breaks and opens a pair of safety seals.

The deployable safety escape ladder may further comprise an attachment hole and may be used to attach a lanyard such that it remains attached to the safety hammer enclosure. The safety hammer includes the pair of glass breaking heads for breaking the glass in the upper floor window as well as the breakable glass shield or a rolled fire-proof blanket which is located in the rear of the escape ladder to cover a plurality of broken glass over the upper floor window while escaping.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
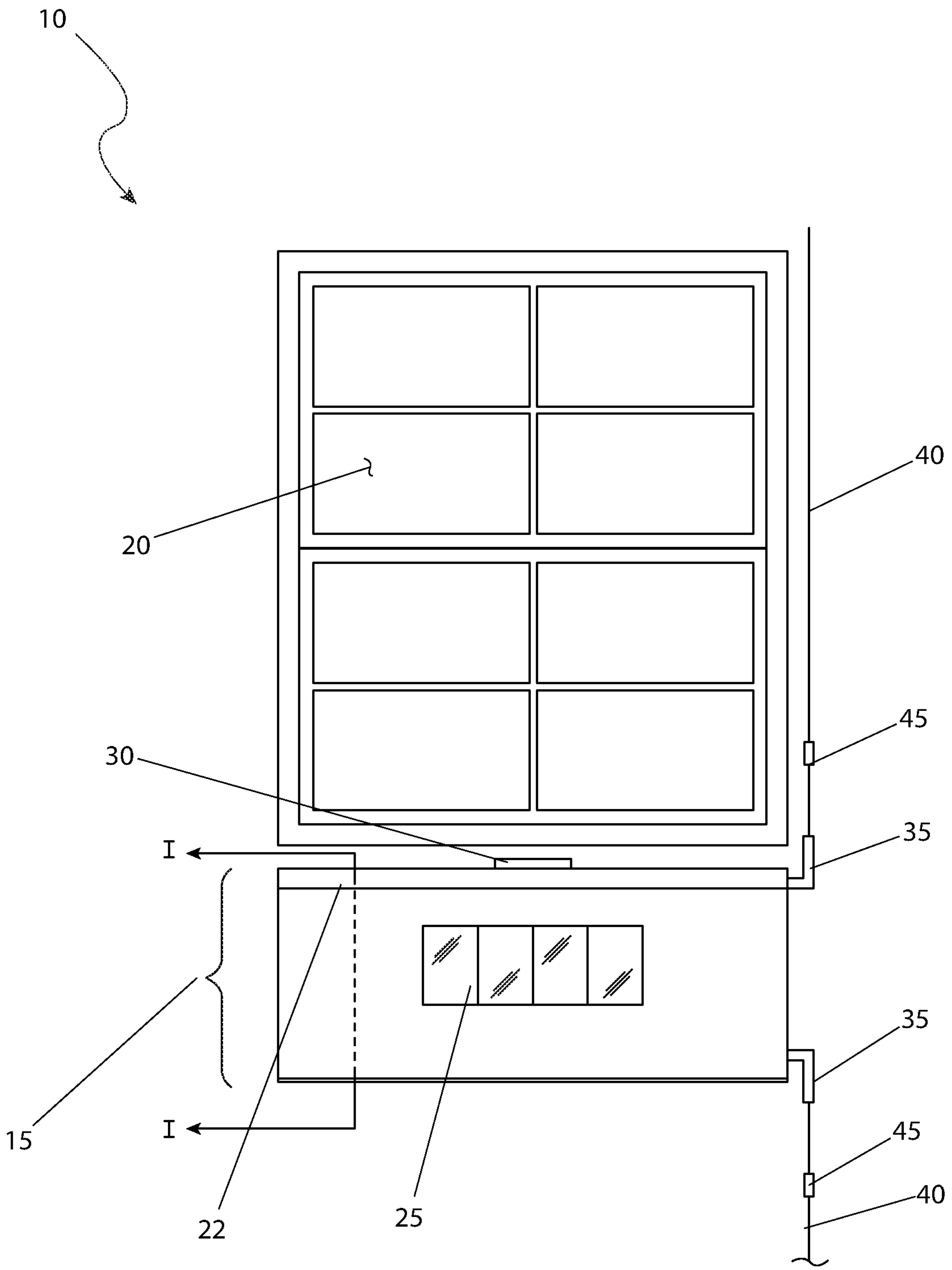
FIG. 1 is a front view of the deployable safety escape ladder, according to the preferred embodiment of the present invention.

10 deployable safety escape ladder
15 outer enclosure
20 upper floor window
22 sloped upper surface
25 photovoltaic cell
30 release latch
35 conduit
40 mechanical cable
45 mechanical disconnecting means
50 breakable glass shield
55 entry slot
60 security tab
65 backing plate
67 interior step
68 interior step connector
70 audio/video playback device
75 safety hammer enclosure
80 safety hammer
85 recessed hand grip
90 safety seals
95 ergonomic handle grip
100 glass breaking head
105 screen cutting edge
107 shaft
110 attachment hole
115 lanyard
120 closure clasp
125 top surface
130 front surface
135 stainless steel hinge
140 travel path "t"
145 ladder tray
150 ladder
155 rung
156 rod
157 fastener
160 chain rail
165 ladder travel path "l"
170 spring
175 rear surface
180 connecting link
185 rechargeable battery
190 audible alarm
195 visual strobe alarm
200 first limit switch
205 second limit switch
210 fire-proof blanket
215 safety grab bar
220 bottom surface
225 non-slip coating
230 grab bar travel path "g"
231 deployment cable
232 eye-ring
233 attachment point
234 mounting bracket
235 guide light
236 spring locking pin
237 alternate mounting position
240 user
245 charge controller

DESCRIPTION OF THE PREFERRED EMBODIMENTS

The best mode for carrying out the invention is presented in terms of its preferred embodiment, herein depicted within FIGS. 1 through 8. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the deployable safety escape ladder 10, according to the preferred embodiment of the present invention is disclosed. The deployble safety escape ladder 10 (herein also described as the "escape ladder") 10, provides for the rapid egress from the upper floors of a building or home in the event of an emergency such as a fire or burglary. The escape ladder 10 utilizes an outer enclosure 15 that is installed immediately below an upper floor window 20 as shown. The size of the outer enclosure 15 may vary based upon size of the window, height above ground and other factors. However, a standard size is envisioned as rear height of ten inches (10 in.), a depth of ten inches (10 in.) and length of twenty-four inches (24 in.). The front height is envisioned as nine inches (9 in.) to allow for a sloped upper surface 22 to allow snow and rain to run off. It is envisioned that the outer enclosure 15 would be manufactured from weatherproof material such as aluminum or stainless steel. However, the exact material of construction is not intended to be a limiting factor of the present invention. The face of the outer enclosure 15 is provided with a photovoltaic cell 25 for powering internal electrical components of the invention, which will be described in greater detail herein below. The top of the outer enclosure 15 is provided with a release latch 30 for activation, which will be described in greater detail herein below.

A set of two (2) conduits 35 exit the side of the outer enclosure 15 which house a mechanical cable 40. The mechanical cable 40 connects the current escape ladder 10 as shown to an identical escape ladder 10 located on upper as well as lower floors of a building or house. When one (1) escape ladder 10 is activated, the mechanical cable 40 serves to activate the escape ladder 10 located on lower floors of the building or house. A mechanical disconnecting means 45 is provided in the mechanical cable 40, such as slip pin fitting, a screw fitting, or the like, to allow the mechanical cable 40 to be effectively severed. This mechanical disconnecting means 45 would be utilized should repair, maintenance, or replacement of an escape ladder 10 be required without the desire to activated lower units.

Figure 2:
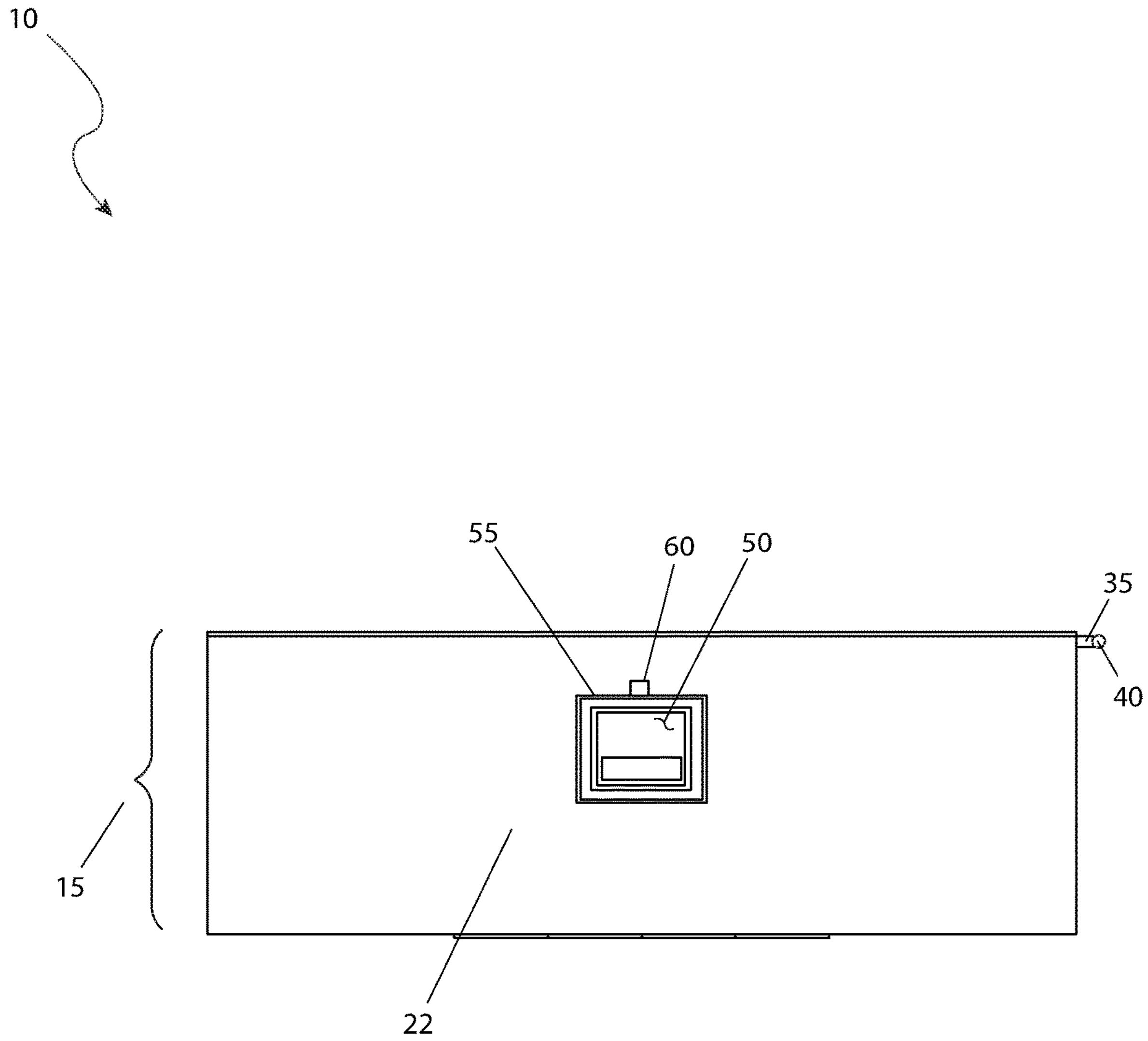
FIG. 2 is a top view of the outer enclosure, as used with the deployable safety escape ladder, according to the preferred embodiment of the present invention.

Referring next to FIG. 2, a top view of the outer enclosure 15, according to the preferred embodiment of the present invention is depicted. The release latch 30 is centrally located on the sloped upper surface 22 and is provided with a breakable glass shield 50. It is user replaceable via an entry slot 55 and a security tab 60. The breakable glass shield 50 is intended to prevent tampering with the escape ladder 10 as well as to prevent inadvertent activation. The breakable glass shield 50 also provides weather protection for the release latch 30. The conduits 35 and the mechanical cable 40 are also visible on the side of the outer enclosure 15.

Figure 3:
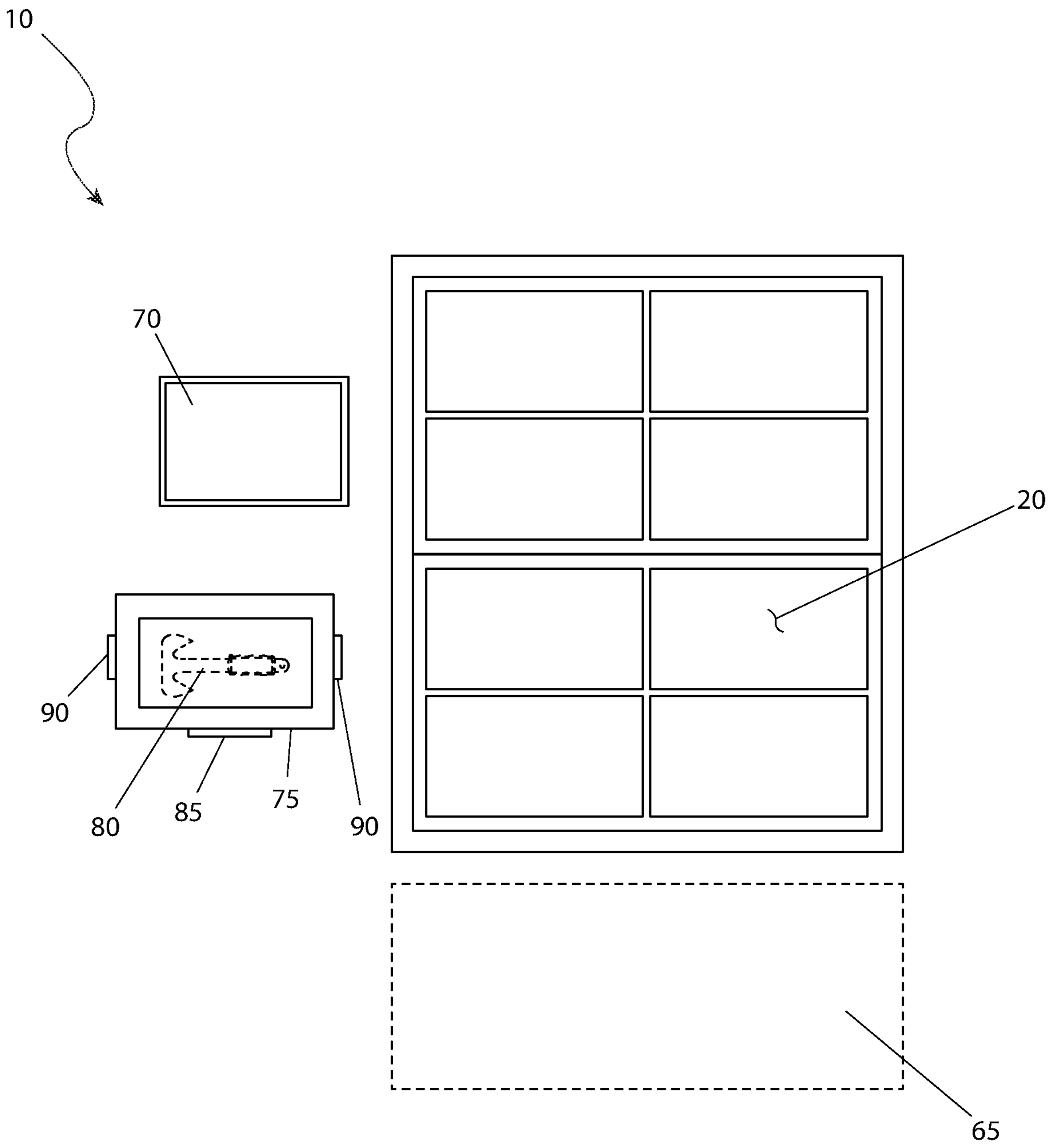
FIG. 3 is an interior view of the upper floor window, equipped with a deployable safety escape ladder, according to the preferred embodiment of the present invention.

Referring now to FIG. 3, an interior view of the upper floor window 20 equipped with an escape ladder 10, according to the preferred embodiment of the present invention is shown. A backing plate 65 (shown by dashed lines due to its hidden nature) is located in the wall cavity below the upper floor window 20. The actual mounting method and means of connection will vary on the construction of the wall, however, the backing plate 65 is intended to provide structural rigidity to the outer enclosure 15 (as shown in FIG. 1). Located alongside the upper floor window 20 is an audio/video playback device 70 which provides instructions, demonstrations, and usage information for the escape ladder 10. The audio/video playback device 70 will operate on a continuously looping manner which will indoctrinate occupants of the building or house in which the escape ladder 10 is installed. Such information will be essential in the operation of the escape ladder 10 during times of duress. Located immediately below the audio/video playback device 70 is a safety hammer enclosure 75 containing a safety hammer 80. The safety hammer 80 will be described in greater detail herein below. The safety hammer enclosure 75 is opened via a recessed hand grip 85 which breaks and opens two (2) safety seals 90. After usage of the escape ladder 10 it would be reassembled, certified, and sealed for future use by an authorized technician.

Figure 4:
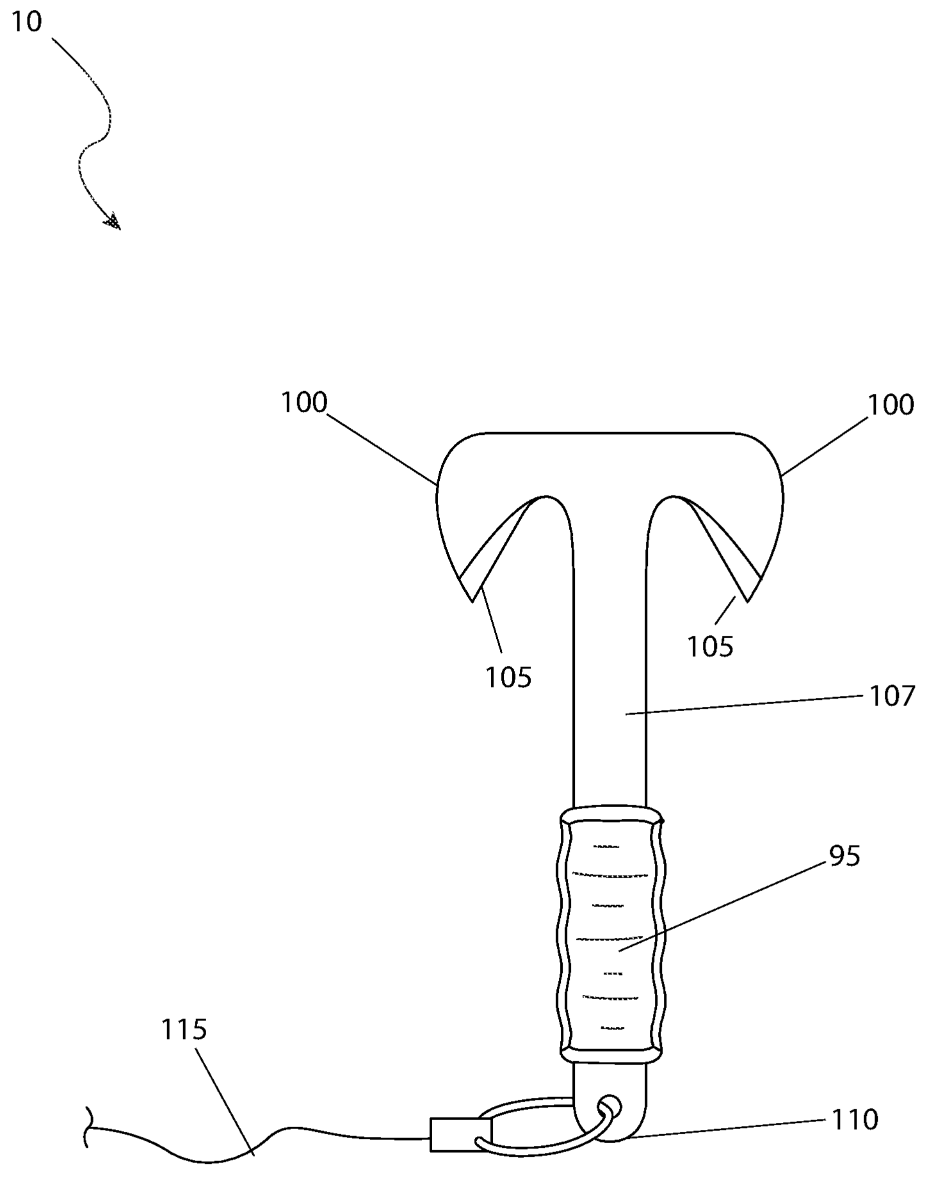
FIG. 4 is a side view of the safety hammer, as used with the deployable safety escape ladder, according to the preferred embodiment of the present invention.

Referring next to FIG. 4, a side view of the safety hammer 80, as used with the escape ladder 10, according to the preferred embodiment of the present invention is disclosed. The safety hammer 80 is provided with two (2) glass breaking heads 100 for breaking the glass in the upper floor window 20 (as shown in FIG. 1 and FIG. 3) as well as the breakable glass shield 50 (as shown in FIG. 2). A set of two (2) screen cutting edges 105 are provided to cut through screens (if any) in the upper floor window 20. A shaft 107 connects the glass breaking heads 100 and the screen cutting edges 105 to the ergonomic handle grip 95. An attachment hole 110 is used to attach a lanyard 115 of sufficient length such that it remains attached to the safety hammer enclosure 75 (as shown in FIG. 3).

Figure 5:
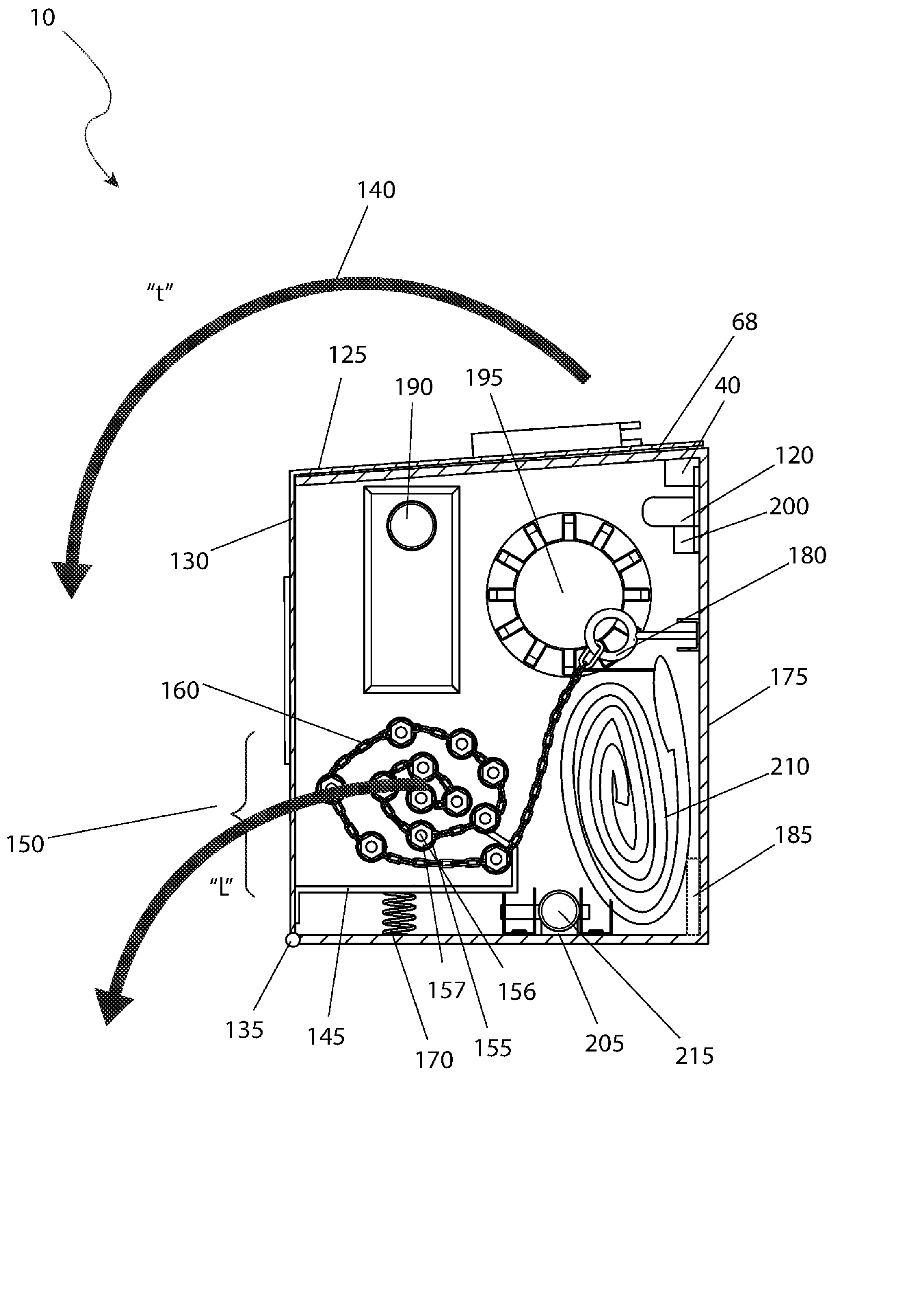
FIG. 5 is a sectional view of the deployable safety escape ladder, as seen along a Line I-I, as shown in FIG. 1, according to the preferred embodiment of the present invention.

Referring now to FIG. 5, a sectional view of the escape ladder 10, as seen along a Line I-I, as shown in FIG. 1, according to the preferred embodiment of the present invention is depicted. When released, the release latch 30 activates a closure clasp 120, also connected to the mechanical cable 40, and allows the top surface 125 and front surface 130 to swing outward along a stainless-steel hinge 135 following a travel path "t" 140. When released, a ladder tray 145, holding a ladder 150 comprised of solid rungs 155 and chain rails 160 also travels outward along a ladder travel path "l" 165 as propelled by two (2) springs 170 (of which only one (1) is shown due to illustrative limitations). The chain rails 160 are each tethered to the rear surface 175 by connecting links 180. Also visible is a rechargeable battery 185, an audible alarm 190, a visual strobe alarm 195, a first limit switch 200, and a second limit switch 205, all of which will be described in greater detail herein below. A rolled fire-proof blanket 210 is located in the rear of the escape ladder 10 which can be used to cover broken glass over the upper floor window 20 (as shown in FIG. 1), to cover the user while escaping, or for any other similar use. A safety grab bar 215 is shown in the stowed position. The function and use of the safety grab bar 215 will be described in greater detail herein below.

Figure 6:
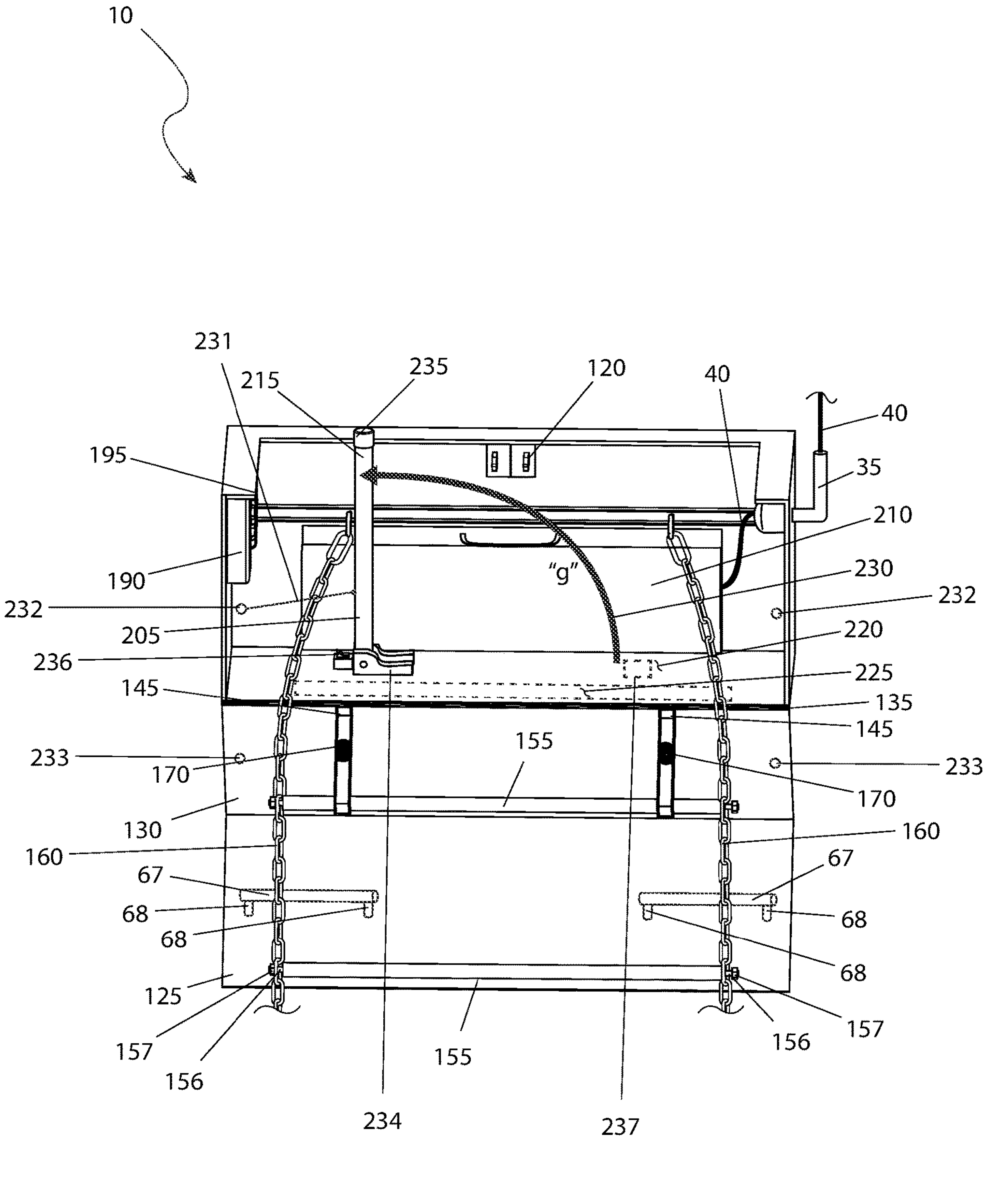
FIG. 6 is an interior perspective view of the deployable safety escape ladder, shown in a deployed position, according to the preferred embodiment of the present invention.

Referring next to FIG. 6, an interior perspective view of the escape ladder 10, shown in a deployed position, according to the preferred embodiment of the present invention is shown. The view depicts the ladder tray 145 deployed outward via the springs 170. A plurality of rungs 155 are visible. Each rung 155 is preferably a hollow tubular member. A threaded rod 156 passes through the rung 155 and opposing aligned links of the chain rails 160 and secured with a pair of fasteners 157, thereby fastening the rung 155 to the chain rails 160. The bottom surface 220 is provided with a non-slip coating 225 to serve as the first step. The fire-proof blanket 210, the audible alarm 190, and the visual strobe alarm 195 is visible as well. The conduits 35 and the contained mechanical cable 40 traveling from an upper floor window 20 (as shown in FIG. 1) if needed, is routed to the closure clasp 120 to allow for automatic release should another escape ladder 10 located above the present one (1) is activated. The safety grab bar 215 is pivoted into an upward vertical position along a grab bar travel path "g" 230 to serve as a holding aid for the user climbing through the upper floor window 20. A deployment cable 231 is attached to the safety grab bar 215 and is routed through an eye-ring 232 where it terminates at an attachment point 233 on the interior of the front surface 130. The deployment cable 231 provides for the automatic upright positioning of the safety grab bar 215 without action on part of the user, which is viewed as beneficial in times of duress. The safety grab bar 215 is secured via a mounting bracket 234 which allows for the ninety-degree (90°) swing path of the grab bar travel path "g" 230. A spring locking pin 236 within the mounting bracket 234 locks the safety grab bar 215 in an upright position during usage. After usage, the spring locking pin 236 can be presses to allow the safety grab bar 215 to be lowered to its stowed position.

An alternate mounting position 237, (herein shown via dashed lines) for the mounting bracket 234 will allow positioning of the safety grab bar 215 on the opposite side of the escape ladder 10. The alternate mounting position 237 would be utilized should installation, user preference or upper floor window 20 (as shown in FIG. 1) type dictate. This alternate mounting position 237 would utilize eye-ring 232 and attachment point 233 on the same side as the alternate mounting position 237. A guide light 235 activated by the second limit switch 205 serves to aid the user in safety in reduced light or smoky conditions. At least one (1) interior step 67 is connected at each distal end to an interior surface of the top surface 125 by an interior step connector 68. In a preferred embodiment, there are two (2) interior steps and four (4) interior step connectors. These interior steps 67 are mounted adjacent the free edge of the top surface 125 and serve as a step for a user 240 to climb over a sill of the upper floor window 20 when the escape ladder 10 is deployed.

Figure 7:
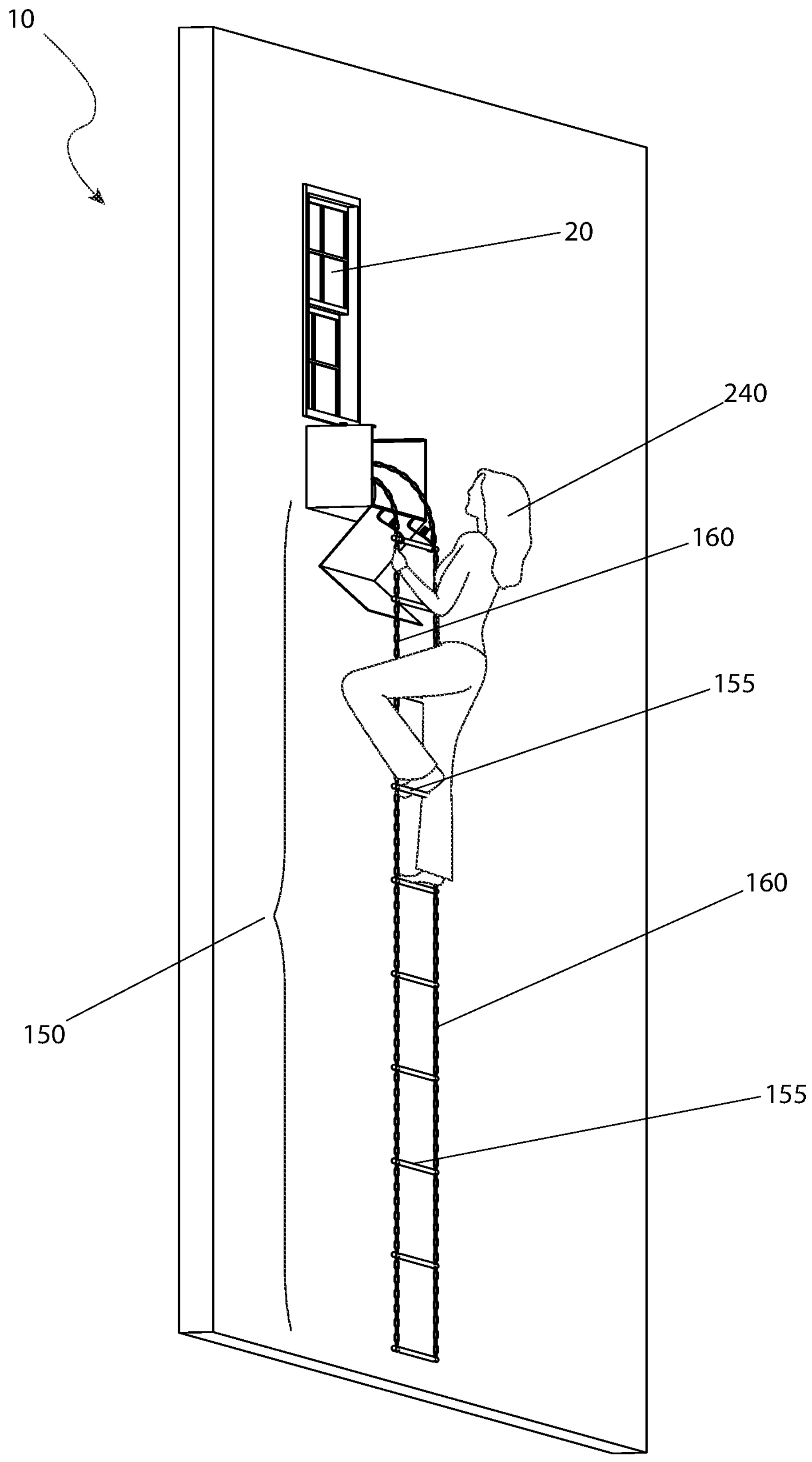
FIG. 7 is a perspective view of the deployable safety escape ladder, shown in a utilized state, according to the preferred embodiment of the present invention.

Referring now to FIG. 7, a perspective view of the escape ladder 10, shown in a utilized state, according to the preferred embodiment of the present invention is disclosed. The escape ladder 10 is installed on an upper floor window 20 and has been activated by releasing the release latch 30 (as shown in FIG. 1 and FIG. 2). The ladder 150 includes the pair of chain rails 160 and rungs 155 has been released and unfurls downward via gravity. The nature of the rungs 155 allow for easier descent by a user 240, in much the same manner as a conventional ladder. The total length of chain rails 160 as well as the number of rungs 155 would be chosen to match the height of the upper floor window 20 above ground. In multi-story office or apartment buildings, it is envisioned the upper floor window 20 would align in a vertical manner, allowing for multiple escape ladder 10 to allow for the descent of the user 240. This interlocking capability is provided by the conduits 35 and the mechanical cable 40 (as shown in FIG. 1 and FIG. 5) as aforementioned described.

Figure 8:
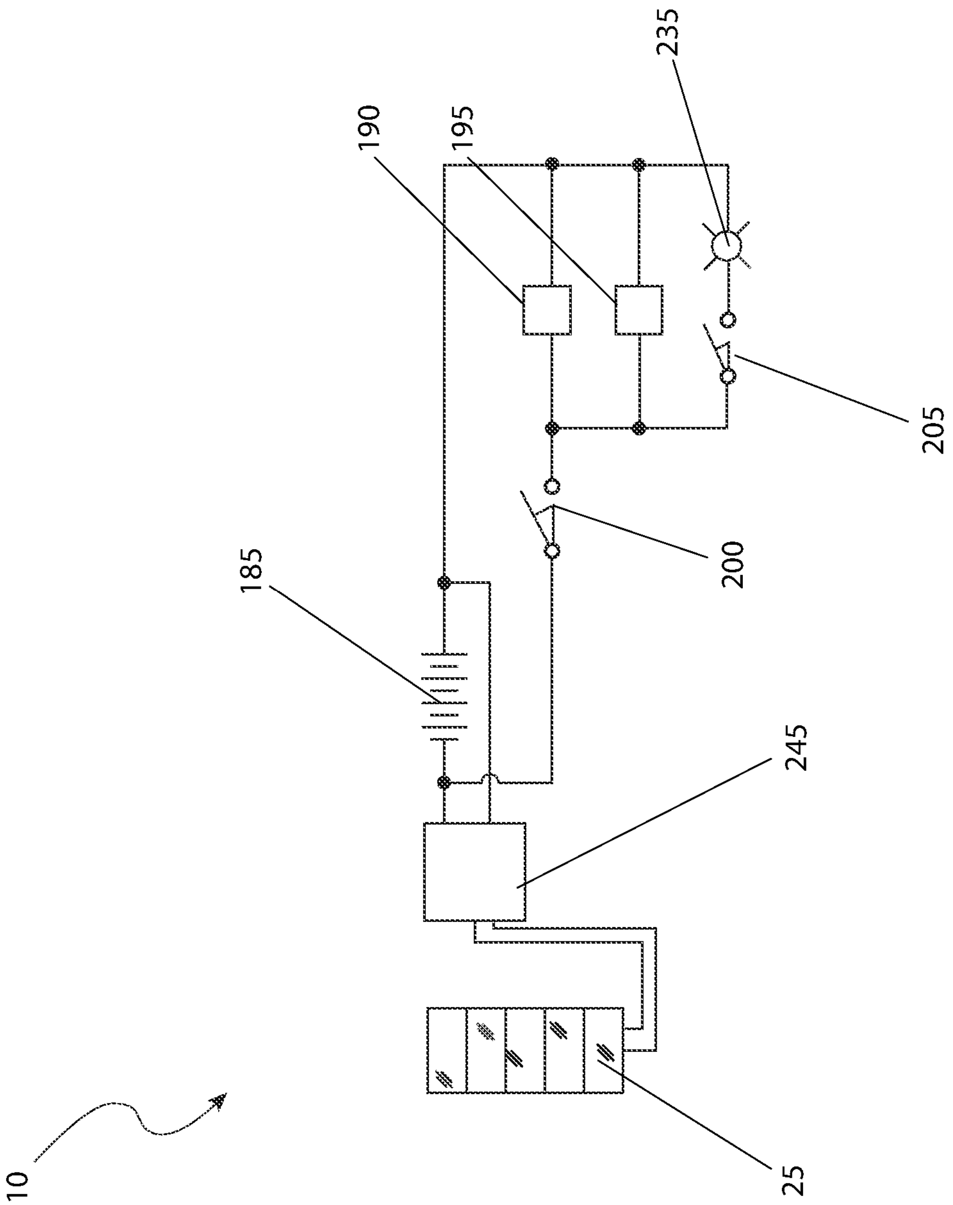
FIG. 8 is an electrical block diagram of the deployable safety escape ladder, according to the preferred embodiment of the present invention.

Referring to FIG. 8, an electrical block diagram of the escape ladder 10, according to the preferred embodiment of the present invention is depicted. Electrical power from the photovoltaic cell 25 is routed through a charge controller 245 to the rechargeable battery 185. The rechargeable battery 185 is then subsequently used to provide power to the balance of the electrical items in the escape ladder 10 due to its ability to provide power even in the event of a power outage as may occur during a fire. Resultant power from the rechargeable battery 185 is routed through the first limit switch 200 which provides power to the audible alarm 190 and the visual strobe alarm 195, connected in a parallel circuit to summon the need for help or assistance. Power is also routed through the second limit switch 205, which when activated by placing the safety grab bar 215 (as shown in FIG. 5 and FIG. 6) into an upright position, illuminates the guide light 235.

2. Operation of the Preferred Embodiment

The preferred embodiment of the present invention can be utilized by the common user in a simple and effortless manner with little or no training. It is envisioned that the escape ladder 10 would be constructed in general accordance with FIG. 1 through FIG. 8. The user would procure the escape ladder 10 from conventional procurement channels such as hardware stores, home improvement stores, mechanical supply houses, mail order and internet supply houses and the like. Special attention would be paid to the overall size of the escape ladder 10 with respect to the size of the upper floor window 20 upon which it is utilized, the overall length of the ladder 150, such that it reaches grade, and the usage of multiple escape ladder 10, within a multi-floor building with upper floor window 20 that align in a vertical manner such that the conduits 35 and the mechanical cable 40 would be utilized.

After procurement and prior to utilization, the escape ladder 10 would be installed in the following manner: the backing plate 65 would be installed on the interior side of the upper floor window 20 along with the audio/video playback device 70 and the safety hammer enclosure 75; the outer enclosure 15 would be installed on the exterior side of the upper floor window 20 and interconnected to the backing plate 65 for stability. At this point in time, the escape ladder 10 is ready for usage.

During utilization of the escape ladder 10, the following procedure would be initiated in the event of an emergency in which egress through the upper floor window 20 is warranted: the user 240, upon being fully briefed on the operation of the escape ladder 10 by viewing the audio/video playback device 70 will access the safety hammer 80 by lifting up on the recessed hand grip 85 and breaking the safety seals 90; the safety hammer 80 is then used to break the upper floor window 20 if necessary or if the upper floor window 20 is of a sealed, non-operational variety; the safety hammer 80 is then used to break the breakable glass shield 50 on the release latch 30; the release latch 30 is activated; the top surface 125 and the front surface 130 open outward along the travel path "t" 140; the ladder 150 unfurls as propelled by the springs 170; the audible alarm 190 and the visual strobe alarm 195 are activated automatically by the first limit switch 200 and as energized by the rechargeable battery 185; the user 240 removes the fire-proof blanket 210 and places it over the broken glass of the upper floor window 20 (if any); the user 240 pivots the safety grab bar 215 into an upright and vertical position whereupon the guide light 235 is illuminated; the user 240 climbs through the upper floor window 20 using the safety grab bar 215 as an aid and the interior steps 67 if needed; the user 240 then descends the ladder 150 in a customary climbing manner. Should multiple escape ladders 10 in a multi-story building need to be utilized, any lower escape ladder 10 would automatically activate the conduits 35 and the mechanical cable 40 and allow for continued, uninterrupted descent. It is also envisioned that emergency rescue personnel could ascend the escape ladder 10 to assist in rescue operations.

After use of the escape ladder 10, it is envisioned that it would be repackaged, certified and the safety hammer 80 replaced, the safety seals 90 replaced, and the breakable glass shield 50 replaced for future usage.

It is envisioned that the deployable safety escape ladder 10 could be utilized on any structure of two (2) floors or more. However, the life-saving capabilities and properties of the escape ladder 10 make it especially beneficial for homeowners, apartment building owners. senior citizen homes, rooming houses. bed and breakfast inns, hospitals, high rises, sports stadiums and arenas, movie theaters, ships, cranes, oil rigs, and similar structures. It may be utilized during a fire, breaking and entering, earthquakes, building collapses and the like. The escape ladder 10 is capable of being installed in limited access areas, is an economical solution to meeting fire exit requirements, can be modified to meet varying height requirements, saves lives, provides alternate escape options, and increases accessibility for first responders.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A deployable safety escape ladder, comprising:

an outer enclosure adapted to be installed below an upper floor window;

a photovoltaic cell disposed on a face of the outer enclosure, the photovoltaic cell supplies electrical power to the deployable safety escape ladder;

a release latch disposed on a top of the outer enclosure for activation;

a pair of conduits exiting a side of the outer enclosure which house a mechanical cable;

a mechanical disconnecting means inserted within in the mechanical cable;

a backing plate disposed in a wall cavity below the upper floor window to provide structural rigidity to the outer enclosure;

an audio/video playback device disposed alongside the upper floor window, the audio/video playback device provides a plurality of instructions, a plurality of demonstrations, and a plurality of usage information for the escape ladder;

a pair of screen cutting edges disposed upon a safety hammer configured to cut through one or more screens in the upper floor window;

a shaft connecting a pair of glass breaking heads and the pair of screen cutting edges to an ergonomic handle grip;

a safety grab bar pivoted into an upward vertical position along a grab bar travel path to serve as a holding aid for climbing through the upper floor window, the safety grab bar is secured via a mounting bracket which allows for a 90° swing path of the grab bar travel path;

a spring locking pin disposed within the mounting bracket locks the safety grab bar in an upright position during usage, the spring locking pin is pressed to allow the safety grab bar to be lowered to a stowed position after usage;

a deployment cable attached to the safety grab bar and is routed through an eye-ring where it terminates at an attachment point on an interior of the front surface, the deployment cable provides for an automatic upright positioning of the safety grab bar;

a plurality of rungs each having a hollow tubular member;

a threaded rod passing through each of the rungs;

a plurality of opposing aligned links of a plurality of chain rails secured with a pair of fasteners fastening each of the rungs to the chain rails; and a bottom surface having a non-slip coating serving as a first step.

2. The deployable safety escape ladder, according to claim 1, wherein the outer enclosure is made of weatherproof material.

3. The deployable safety escape ladder, according to claim 1, wherein the release latch activates a closure clasp connected to the mechanical cable and allows the top surface and the front surface to swing outward along a stainless-steel hinge following a travel path.

4. The deployable safety escape ladder, according to claim 1, wherein the release latch activates a ladder tray holding a ladder having a plurality of solid rungs and a plurality of chain rails that travel outward along a ladder travel path propelled by a pair of springs.

5. The deployable safety escape ladder, according to claim 1, wherein the chain rails are each tethered to a rear surface by a plurality of connecting links.

6. The deployable safety escape ladder, according to claim 1, wherein the release latch is centrally located on a sloped upper surface and is provided with a breakable glass shield.

7. The deployable safety escape ladder, according to claim 6, wherein the breakable glass shield is intended to prevent tampering with as well as to prevent inadvertent activation.

8. The deployable safety escape ladder, according to claim 6, wherein the breakable glass shield includes weather protection for the release latch.

9. The deployable safety escape ladder, according to claim 1, wherein the release latch is replaceable via an entry slot and a security tab.

10. The deployable safety escape ladder, according to claim 1, wherein the mechanical cable connects the deployable safety escape ladder located on one or more upper floors as well as one or more lower floors of the building.

11. The deployable safety escape ladder, according to claim 1, wherein the mechanical cable serves to activate the deployable safety escape ladder located on one or more lower floors of the building when the deployable safety escape ladder is activated.

12. The deployable safety escape ladder, according to claim 1, wherein the mechanical disconnecting means is utilized to repair, to maintain, or to replace of an escape ladder.

13. The deployable safety escape ladder, according to claim 1, wherein the mechanical disconnecting means is a slip pin fitting.

14. The deployable safety escape ladder, according to claim 1, wherein the mechanical disconnecting means is a screw fitting.

15. The deployable safety escape ladder, according to claim 1, wherein the audio/video playback device operates on a continuously looping manner which will indoctrinate one or more occupants of the building in which the escape ladder is installed.

16. The deployable safety escape ladder, according to claim 1, wherein the audio/video playback device is a safety hammer enclosure containing the safety hammer.

17. The deployable safety escape ladder, according to claim 16, wherein the safety hammer enclosure is opened via a recessed hand grip which breaks and opens a pair of safety seals.

18. The deployable safety escape ladder, according to claim 16, further comprising an attachment hole is used to attach a lanyard such that it remains attached to the safety hammer enclosure.

19. The deployable safety escape ladder, according to claim 1, wherein the safety hammer includes the pair of glass breaking heads for breaking the glass in the upper floor window as well as the breakable glass shield.

20. The deployable safety escape ladder, according to claim 1, further comprising a rolled fire-proof blanket located in a rear of the escape ladder to cover a plurality of broken glass over the upper floor window while escaping.

* * * * *